US012519695B1

(12) United States Patent
Mecca et al.

(10) Patent No.: US 12,519,695 B1
(45) Date of Patent: Jan. 6, 2026

(54) APPARATUS AND METHOD FOR GENERATING AN OPTIMIZED OPERATION OF A MULTIMODAL UNIT AS A FUNCTION OF A NETWORK OPTIMIZER

(71) Applicant: PortPro Technologies, Inc., Jersey City, NJ (US)

(72) Inventors: Michael Mecca, Ridgefield, NJ (US); Srinivasa Sarma, Minneapolis, MN (US); Corey Abbott, Charlotte, NC (US)

(73) Assignee: PortPro Technologies, Inc., Jersey City, NJ (US)

( * ) Notice: Subject to any disclaimer, the term of this patent is extended or adjusted under 35 U.S.C. 154(b) by 0 days.

(21) Appl. No.: 19/252,699

(22) Filed: Jun. 27, 2025

(51) Int. Cl.
*H04L 41/0823* (2022.01)
*H04L 43/045* (2022.01)
*H04L 43/0852* (2022.01)

(52) U.S. Cl.
CPC ........ *H04L 41/0823* (2013.01); *H04L 43/045* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 2011/0246067 A1* | 10/2011 | Markham | G08G 1/096844 701/414 |
| 2016/0148153 A1 | 5/2016 | Barahona et al. | |
| 2018/0158020 A1* | 6/2018 | Khasis | G01C 21/343 |
| 2021/0356279 A1* | 11/2021 | Szigeti | G01C 21/3407 |
| 2023/0245573 A1* | 8/2023 | Rockafellow | G08G 5/34 701/120 |
| 2023/0419262 A1 | 12/2023 | Gross et al. | |

FOREIGN PATENT DOCUMENTS

AU  2004234423 B2  11/2005

* cited by examiner

*Primary Examiner* — Fadi Haj Said
(74) *Attorney, Agent, or Firm* — Caldwell Intellectual Property Law

(57) ABSTRACT

An apparatus and method for generating an optimized operation of a multimodal unit as a function of a network optimizer. The apparatus includes at least a processor and a memory communicatively connected to the at least a processor. The memory instructs the processor to receive entity data from an entity database, retrieve port data from a port node, identify a geolocation of a multimodal unit, generate one or more routes of the multimodal unit as a function of a target temporal datum and real-time data, determine an optimized route of the one or more routes based on the target temporal datum, the real-time data, and an assignment of an operator and display a visualization of the optimized operation.

18 Claims, 9 Drawing Sheets

APPARATUS AND METHOD FOR GENERATING AN OPTIMIZED OPERATION OF A MULTIMODAL UNIT AS A FUNCTION OF A NETWORK OPTIMIZER

FIELD OF THE INVENTION

The present invention generally relates to the field of artificial intelligence. In particular, the present invention is directed to an apparatus and a method for generating an optimized operation of a multimodal unit as a function of a network optimizer.

BACKGROUND

Existing systems for managing multimodal operations often rely on computationally expensive global optimization strategies that reprocess entire routes when localized changes occur. This approach can lead to inefficient resource use, especially when disruptions in one segment unnecessarily affect otherwise optimal paths. Additionally, these systems typically lack the ability to apply lightweight, segment-specific heuristics, such as greedy algorithms based on urgency or energy efficiency, to enable efficient, real-time decision-making.

SUMMARY OF THE DISCLOSURE

In an aspect, an apparatus for generating an optimized operation of a multimodal unit as a function of a network optimizer includes at least a processor and a memory communicatively connected to the at least a processor. The memory contains instructions configuring the processor to receive entity data from an entity database, retrieve, using an application programming interface, port data from a port node, identify, using the at least a processor, a geolocation of a multimodal unit, generate, using the at least a processor, one or more routes of the multimodal unit as a function of a target temporal datum and real-time data, determine, using a network optimizer, an optimized route of the one or more routes based on the target temporal datum, the real-time data, and an assignment of an operator, wherein determining the optimized route comprises receiving a plurality of route segments of the one or more routes, locally optimizing each route segment of the plurality of route segments for a segment parameter, and assembling each locally optimized route segment into the optimized route, generate, using the network optimizer, an optimized operation using the optimized route and the assignment of the operator, display, using a graphical user interface of a downstream device, a visualization of the optimized operation, and execute, using the at least a processor, the optimized operation.

In another aspect, a method for generating an optimized operation of a multimodal unit as a function of a network optimizer includes receiving, using at least a processor, entity data from an entity database, retrieving, using an application programming interface, port data from a port node, identifying, using the at least a processor, a geolocation of a multimodal unit, generating, using the at least a processor, one or more routes of the multimodal unit as a function of a target temporal datum and real-time data, determining, using a network optimizer, an optimized route of the one or more routes based on the target temporal datum, the real-time data, and an assignment of an operator, wherein determining the optimized route comprises receiving a plurality of route segments of the one or more routes, locally optimizing each route segment of the plurality of route segments for a segment parameter, and assembling each locally optimized route segment into the optimized route, generating, using the network optimizer, an optimized operation using the optimized route and the assignment of the operator, displaying, using a graphical user interface of a downstream device, a visualization of the optimized operation, and executing, using the at least a processor, the optimized operation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating an optimized operation of a multimodal unit as a function of a network optimizer. The apparatus includes at least a computing device comprised of a processor and a memory communicatively connected to the processor. The memory instructs the processor to receive entity data from an entity database. The processor retrieves, using an application programming interface, port data from a port node. The processor identifies a geolocation of a multimodal unit. Additionally, the processor generates one or more routes of the multimodal unit as a function of a target temporal datum and real-time data. The processor determines, using a network optimizer, an optimized route of the one or more routes based on the target temporal datum, the real-time data, and an assignment of an operator, wherein determining the optimized route comprises receiving a plurality of route segments of the one or more routes, locally optimizing each route segment of the plurality of route segments for a segment parameter, and assembling each locally optimized route segment into the optimized route. The memory then instructs the processor to generate, using the network optimizer, an optimized operation using the optimized route and the assignment of the operator. The processor displays, using a graphical user interface of a downstream device, a visualization of the optimized operation. The processor then executes the optimized operation.

Figure 1:
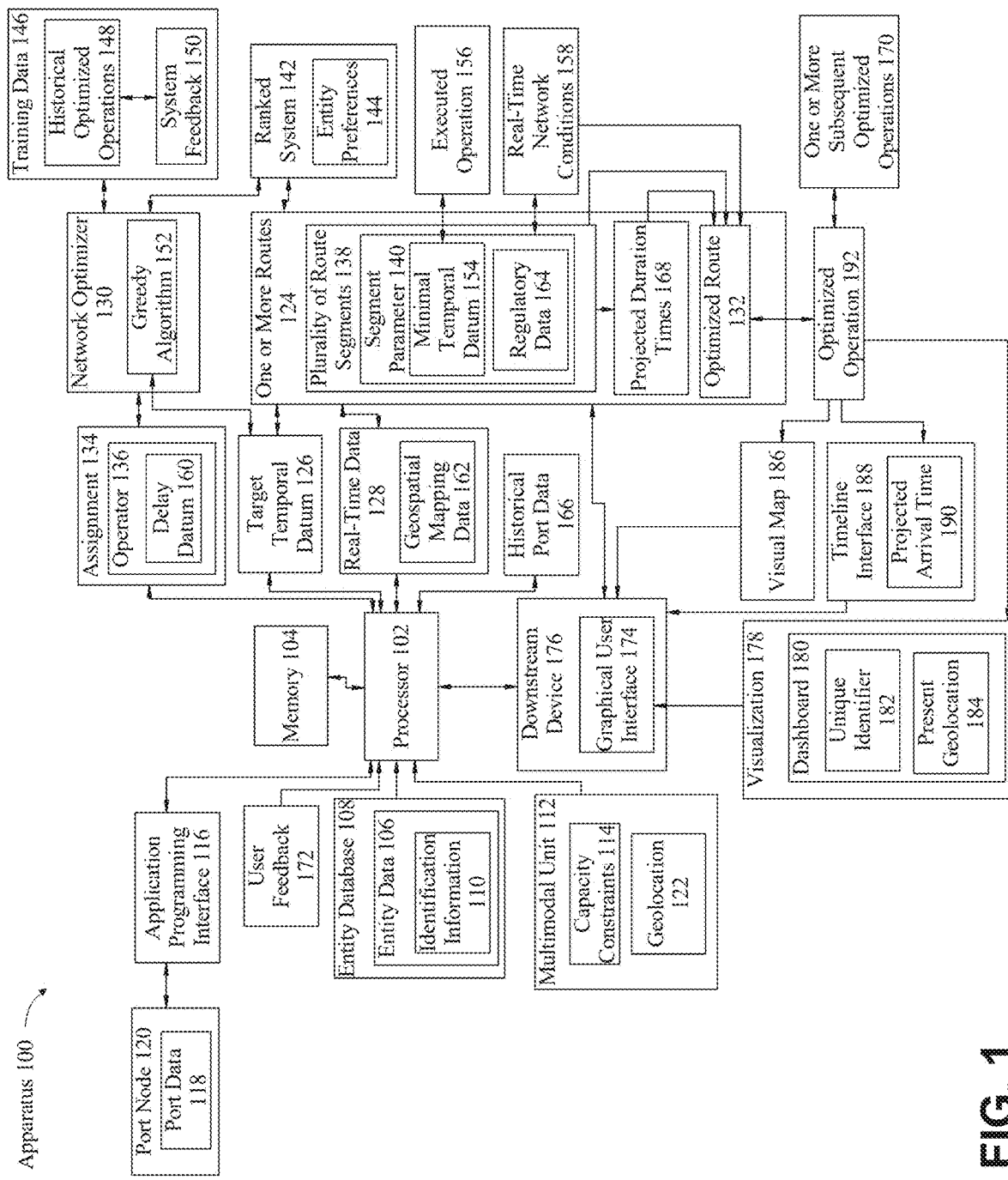
FIG. 1 is a block diagram of an apparatus for generating an optimized operation of a multimodal unit as a function of a network optimizer.

Referring now to FIG. 1, an exemplary embodiment of apparatus 100 for generating an optimized operation of a multimodal unit as a function of a network optimizer is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive entity data 106 from an entity database 108. As used in this disclosure, "entity data" is customer data associated with an individual or organizational user interacting with the apparatus 100. Entity data 106 may include, for example, without limitation, customer name, contact information, purchase history, expressed preferences, shipping timelines, payment methods, account status, loyalty tier, subscription type, customer support interactions, and product return patterns. Entity data 106 may include identifying attributes such as a customer's full name, email address, billing address, phone number, and the like. Entity data 106 may include logistics-related metrics such as standard shipping timelines for that customer, preferred carriers, delivery instructions, and the like. In some implementations, entity data 106 may include communication preferences, such as whether the customer prefers SMS or email updates, and customer service interactions, including prior support tickets or satisfaction ratings. Continuing, entity data 106 may be aggregated to inform personalized experiences, streamline future transactions, and/or drive predictive models for customer behavior.

With continued reference to FIG. 1, as used in this disclosure, an "entity" is a customer that interacts with the apparatus 100. Without limitation, the entity may be a retail customer placing online orders for personal use, a merchant receiving inventory shipments for resale, a small shop owner managing recurring product deliveries to maintain stock levels, or a regional distributor coordinating logistics across multiple storefronts. The entity may include enterprise clients ordering in bulk, subscription-based customers expecting scheduled shipments, marketplace vendors purchasing components for assembly and redistribution, and the like. Each entity, whether individuals or businesses, may have associated entity data 106 that reflects their operational needs, preferences, timelines, transactional behaviors, and the like. As used in this disclosure, an "entity database" is a data repository configured to store, manage, and retrieve information related to one or more entities. In an embodiment, the entity database 108 may include records for each entity, including data fields such as customer identification numbers, contact details, billing shipping addresses, purchase history, payment preferences, delivery timelines, communication preferences, customer segmentation classifications, and the like. The entity database 108 may store dynamic information such as real-time order statuses, loyalty rewards progress, or customer service interactions. For business-facing entities, such as merchants or small business owners, the entity database 108 may further track vendor relationships, inventory flow, wholesale pricing, or recurring procurement schedules. The entity database 108 may be queried or updated by various system components to support decision-making, personalize user experiences, and coordinate logistical or financial operations.

With continued reference to FIG. 1, the entity data 106 may include identification information 110 associated with the multimodal unit 112 and capacity constraints 114 of the multimodal unit 112. As used in this disclosure, "identification information" is data that uniquely characterizes within a broader operational framework. As used in this disclosure, "capacity constraints" are limitations or predefined thresholds associated with the physical capabilities of a resource. In an embodiment, the identification information 110 may include a unique tracking number, cargo ID, serial code, or digital token assigned to the multimodal unit 112 to ensure traceability throughout the supply chain. The capacity constraints 114 may include metrics such as maximum weight tolerance, allowable volume, temperature control thresholds, stacking limits, hazardous materials classifications, and the like. This information may be used to verify compliance with transport regulations, match cargo to appropriate transit methods, dynamically adjust routing or packaging strategies, and the like.

Still referring to FIG. 1, processor 102 is configured to retrieve, using an application programming interface 116, port data 118 from a port node 120. As used in this disclosure, an "application programming interface" (API) is a defined set of protocols and functions that enables the processor 102 of a computing system to programmatically request and retrieve data or services from an external software application, system, or data source. APIs 116 may allow automated communication between systems, including real-time data 128 exchange with third-party or proprietary platforms. For example, without limitation, the API 116 may be used to automatically request and retrieve port data 118, including container status updates, vessel schedules, or return deadlines, from a port node 120. The API 116 may accept structured queries such as, using HTTP requests or JSON payloads, authenticate the request using a token or credential, and return structured responses that the receiving system can parse and incorporate into its own processing logic. Continuing, this may allow the processor 102 to programmatically access real-time information from third-party systems in a secure, standardized, and scalable manner. As used in this disclosure, "port data" is information associated with logistics, scheduling, tracking, and operational conditions of shipping ports. Without limitation, port data 118 may include information such as container gate-in and gate-out times, assigned container return deadlines, vessel berth schedules, yard utilization levels, port congestion metrics, crane operation status, environmental conditions like, wind speed or tide level, and the like. Port data 118 may also reflect changes in container location, dwell times, or customs release notifications, all of which may be retrieved using the API 116 from a port node 120 to optimize downstream logistics and scheduling decisions. As used in this disclosure, a "port node" is a networked representation of a physical port associated with a logistics management system. In an embodiment, the port node 120 may be configured to provide port data 118 to a connected system such as the apparatus 100. Without limitation, the port node 120 may expose the data through an API 116 or other network-accessible data feed, allowing retrieval of real-time or scheduled information relevant to cargo movement and container status. In an embodiment, port node 120 may be hosted by a port authority, terminal operator 136, or third-party data provider, and may expose a range of services including real-time container tracking, vessel arrival predictions, return appointment availability, and congestion reports. The port node 120 may integrate with IoT sensors, RFID tracking systems, terminal operating systems, and the like, to ensure the data it provides is both accurate and timely. The processor 102 may query the port node 120 periodically or in response to events to retrieve actionable data for use in optimizing cargo routing or scheduling decisions.

Still referring to FIG. 1, processor 102 is configured to identify a geolocation 122 of a multimodal unit 112. As used in this disclosure, "geolocation" is positional information indicating the physical location of an object, entity, or system component in geographic space, typically expressed in terms of coordinates such as latitude and longitude. Geolocation 122 may be derived from GPS signals, cellular triangulation, Wi-Fi positioning, or other location-based services. Without limitation, the geolocation 122 may be used to track the real-time position of a multimodal unit 112 as it moves through a logistics network. The geolocation 122 may be collected by embedded tracking devices or mobile sensors and transmitted to a monitoring system to inform routing decisions, update estimated arrival times, or detect deviations from a planned route. As used in this disclosure, a "multimodal unit" is cargo or a cargo container configured to be transported using one or more modes of transportation. The modes of transportation may include, without limitation, ship, rail, and truck, flight, and the like. Without limitation, the multimodal unit 112 may include an intermodal shipping container carrying retail goods, medical supplies, raw materials, and the like. The apparatus 100 may track the multimodal unit 112 across shipping vessels, freight trains, last-mile delivery trucks, and the like, maintaining continuous oversight over location, capacity, and status while optimizing transitions between transport modes based on port data 118, congestion metrics, or delivery windows.

Still referring to FIG. 1, processor 102 is configured to generate one or more routes 124 of the multimodal unit 112 as a function of a target temporal datum 126 and real-time data 128. As used in this disclosure, a "route" is a navigable path for a multimodal unit 112. In an embodiment, the one or more routes 124 may be composed of one or more route segments 138, and generated as a function of a target temporal datum 126 and real-time data 128. Without limitation, the route may encompass spatial and temporal parameters including geolocation coordinates, projected duration times 168, regulatory constraints, and may be optimized based on operational criteria such as segment parameters 140, operator 136 assignment 134, and the like. As used in this disclosure, a "segment parameter" is a quantifiable attribute associated with an individual route segment that is used to evaluate, prioritize, or optimize that segment within a larger route. Segment parameters 140 may include, but are not limited to, temporal data such as estimated duration, delay risk, spatial data like, geolocation coordinates, distance, regulatory constraints such as, weight limits, access times, resource availability such as, operator 136 readiness, equipment constraints, environmental conditions like, weather, road conditions, and operational priorities like, cost efficiency, fuel consumption. Segment parameters 140 may enable localized decision-making within a network optimizer 130, allowing each segment to be independently assessed and optimized before being assembled into a full route. The route May serve as a basis for planning, optimizing, and executing the movement or operation of the multimodal unit 112 within a dynamic network. In a non-limiting example, the one or more routes 124 may comprise a travel path of a multimodal unit 112 from a warehouse in Los Angeles, California, to a port terminal in Oakland, California, incorporating segments for highway transport, toll checkpoints, and a final port entry gate, each defined by real-time traffic data, regulatory access windows, and geofencing restrictions. In another non-limiting example, the one or more routes 124 may include the intermodal transit of a shipping container from a rail yard in Chicago, Illinois, to a cargo vessel docked in Norfolk, Virginia. The route may involve segments for rail transport, on-road drayage transfer to a terminal, and port gate scheduling, with each segment optimized for minimal transit delay using real-time rail congestion data and port appointment windows. Continuing the previous non-limiting example, the route may also adapt dynamically in response to weather alerts or an operator 136 shift availability, rerouting the unit through an alternative rail spur or rescheduling a port slot while preserving the target arrival time.

With continued reference to FIG. 1, as used in this disclosure, a "target temporal datum" is a time-based milestone. For example, without limitation, the target temporal datum 126 may include an estimated time of delivery (ETD), which serves as a reference point for planning, routing, and optimizing the movement of a multimodal unit 112. The target temporal datum 126 may be established based on service level agreements, customer requirements, operational schedules, regulatory deadlines, and the like. For examples, without limitation, the target temporal datum 126 may be derived from a customer requirement specifying a just-in-time delivery to a manufacturing facility by 8:00 AM on a particular date, ensuring that the delivery aligns with production schedules. Continuing the previous non-limiting example, an operational schedule may define the availability window for a receiving dock at a distribution center, and the target temporal datum 126 may be set to fall within this window to coordinate inbound logistics. In an additional non-limiting example, a regulatory deadline such as a port curfew mandating that all trucks must exit the port premises by 10:00 PM may drive the selection of a target temporal datum 126 that ensures the multimodal unit 112 clears the port before the curfew. As used in this disclosure, "real-time data" is dynamic, context-sensitive information acquired contemporaneously with system operations. In an embodiment, the real-time data 128 may impact the delivery or routing of a multimodal unit 112. Real-time data 128 may include, but is not limited to, traffic conditions, weather updates, infrastructure availability, port congestion, equipment status, operator 136 availability, and the like. In a non-limiting example, if the multimodal unit 112 is scheduled to be delivered by 6:00 PM, the target temporal datum 126, but real-time data 128 shows highway delays due to construction, processor 102 may generate an alternate route that bypasses the congested area while still aiming to meet the 6:00 PM arrival time.

Still referring to FIG. 1, processor 102 is configured to determine, using a network optimizer 130, an optimized route 132 of the one or more routes 124 based on the target temporal datum 126, the real-time data 128, and an assignment 134 of an operator 136, wherein determining the optimized route 132 comprises receiving a plurality of route segments 138 of the one or more routes 124, locally optimizing each route segment of the plurality of route segments 138 for a segment parameter, and assembling each locally optimized route 132 segment into the optimized route 132. As used in this disclosure, a "network optimizer" is a computational model that processes multiple input parameters to determine an optimal route configuration and operational plan for a multimodal unit 112. In an embodiment, the multiple input parameters may include, without limitation, temporal constraints, real-time data 128, operator 136 availability, segment parameters 140, and the like. As used in this disclosure, an "optimized route" is a route that has been computationally selected from among a plurality of routes 124 based on a defined set of criteria. Without limitation, the defined set of criteria may include but is not limited to a target temporal datum 126, real-time data 128, operator 136 assignment 134, locally optimized route 132 segments, and the like. In an embodiment, when selecting the optimized route 132, the objective may include achieving the most efficient, timely, and/or compliant path for the multimodal unit 112. As used in this disclosure, an "assignment" is a defined allocation of a specific operator 136 or resource to a multimodal unit 112 or operation, determined as part of the optimization process, and based on one or more criteria. In an embodiment, the one or more criteria may include availability, preferences of the system/user/customer/etc., regulatory limits, or performance history. As used in this disclosure, an "operator" is an individual or entity responsible for executing or supervising a segment of the route of the multimodal unit 112. In an embodiment, the operator 136 may be a person, an organization, an autonomous vehicle, and the like. In an embodiment, the operator 136 may conduct activities such as driving, dispatching, or monitoring. The operator 136 may be human like a truck driver or port crane operator 136, or digital like, an autonomous control module. As used in this disclosure, a "route segment" is a discrete, contiguous portion of a complete route that can be independently evaluated, optimized, and assembled into a full path. Without limitation, the route segments 138 may correspond to transportation legs, such as highway travel, rail transit, port docking and may be characterized by specific start and end points and contextual parameters. In a non-limiting example, the network optimizer 130 may receive three potential routes 124 for a container delivery from Houston, Texas, to the Port of Savannah, Georgia. Each route may include several route segments 138, such as highway portions, intermodal transfer points, port entry zones, and the like. The network optimize may evaluate each segment for its estimated duration, a segment parameter, based on real-time traffic and weather, real-time data 128, with a target temporal datum 126 of 2:00 PM the next day. The network optimizer 130 may identify that Route A has the fewest projected delays and assigns a certified driver, the operator 136, whose hours of service match the route's requirements. Without limitation, the apparatus 100 may generate an optimized route 132 based on the aforementioned process that meets the delivery target efficiently. In another non-limiting example, the multimodal unit 112 must be routed from a distribution center in Denver, Colorado, to a seaport in Los Angeles, California. The target temporal datum 126 may be driven by a customer requirement for delivery before a vessel's cutoff time. The network optimizer 130 may evaluate multiple route segments 138, including interstate travel, a weigh station checkpoint, and an urban delivery corridor. Each segment may be locally optimized based on segment parameters 140 such as estimated fuel cost and time to completion. The optimizer may assign an operator 136 certified for hazardous material handling, a constraint, and assemble the lowest-risk, time-compliant path as the optimized route 132.

With continued reference to FIG. 1, assigning, using the network optimizer 130, the operator 136 further may include applying, using the at least a processor 102, a ranked system 142 comprising entity preferences 144 associated with the operator 136. As used in this disclosure, a "ranked system" is a hierarchical framework implemented by the network optimizer 130 to evaluate and assign operators 136 to multimodal units 112 based on a set of entity preferences 144. The ranked system 142 may order potential operator 136 assignments 134 according to how well each operator 136 matches the preferences, constraints, or requirements of an associated entity, such as a shipping company, customer, or logistics coordinator. As used in this disclosure, "entity preferences" are selectable or predefined criteria specified by an entity governing the assignment 134 of operators 136 to multimodal units 112. Without limitation, the entity preferences 144 may include qualifications, historical performance metrics, operator 136 availability, regional familiarity, cost considerations, language proficiency, regulatory certifications, and the like. In a non-limiting example, the entity preference may specify a strong preference for assigning operators 136 who have successfully completed more than ten prior on-time deliveries to a specific port. The ranked system 142 may score all available operators 136 accordingly and assign the highest-ranked operator 136 who meets this experience threshold. In another non-limiting example, the entity preference may include a cost-efficiency policy that favors operators 136 with lower contractual hourly rates. The ranked system 142 may evaluate available operators 136 and assign the operator 136 with the best balance of rate and availability while still meeting operational constraints and delivery timelines.

With continued reference to FIG. 1, the network optimizer 130 may be trained using training data 146 which may include historical optimized operations 148 and associated with system feedback 150. As used in this disclosure, "historical optimized operations" are previously executed routing operations that were generated using an optimization process. In an embodiment, the historical optimized operations 148 may include outcome data, contextual conditions, route structures, operator 136 assignments, performance metrics, and the like. The historical optimized operations 148 may serve as training examples for the network optimizer 130, allowing it to learn patterns, improve future decision-making, and refine optimization strategies over time. As used in this disclosure, "system feedback" is evaluative information. In an embodiment, the system feedback 150 may be derived from system performance, user input, sensor data, post-operation analytics, and the like that reflect the success, failure, efficiency, or deviation of an executed operation 156 relative to expected outcomes. System feedback 150 may include delivery punctuality, resource utilization, operator 136 compliance, delay reports, user satisfaction scores, and the like. System feedback 150 may be used to train, recalibrate, and/or validate the network optimizer 130. In a non-limiting example, the network optimizer 130 may be trained using historical optimized operations 148 that detail successful cargo deliveries from Chicago to New York using an optimal route involving rail and truck. Each operation may include route segments 138, time of travel, assigned operators 136, and final delivery times. The associated system feedback 150 may include actual versus projected delivery times, operator-reported issues, sensor data indicating congestion delays, and the like. Without limitation, by analyzing this data, the network optimizer 130 may learn which route configurations consistently meet deadlines and which segments are prone to delays under specific conditions. In another non-limiting example, historical optimized operations 148 may include a set of maritime deliveries where different operators 136 were assigned based on port schedules and weather conditions. System feedback 150 may include real-time data 128 on vessel docking delays, customer satisfaction scores, and instances where alternate routes led to earlier arrivals. The network optimizer 130 may use this data to recognize patterns, such as favoring certain operators 136 for specific ports or adjusting for weather-related delays, which the network optimizer 130 may then apply to improve future routing decisions.

With continued reference to FIG. 1, the network optimizer 130 further may include a greedy algorithm 152, the greedy algorithm 152 configured to select each route segment based on a minimum temporal datum 154 associated with an executed operation 156 of the multimodal unit 112, and generate the optimized operation 192 based on real-time network conditions 158. As used in this disclosure, a "greedy algorithm" is a computational approach that constructs a solution by selecting the locally optimal choice at each step with the objective of achieving a globally efficient result. In an embodiment, the greedy algorithm 152 may prioritize immediate benefits, such as the shortest time or lowest cost for each route segment, without reconsidering previous decisions. In a non-limiting example, the network optimizer 130 may utilize various types of greedy algorithms 152 to enhance routing decisions for the multimodal unit 112. Without limitation, a pure greedy algorithm 152 may be applied to select each subsequent route segment based solely on the shortest travel time available at that moment, without regard for how that choice impacts future segments. Additionally and/or alternatively, a greedy algorithm 152 with lookahead may be employed to evaluate not just the immediate benefit of a segment but also to consider forecasted congestion or delays, allowing the optimizer to anticipate downstream conditions. In another non-limiting example, a greedy algorithm 152 with backtracking capability may be used, to enable the apparatus 100 to revise earlier segment choices if subsequent selections reveal that a more efficient path is possible. Continuing, in another non-limiting example, a weighted greedy algorithm 152 may be applied, to allow the network optimizer 130 to balance multiple objectives such as time, cost, and environmental impact based on dynamically adjustable criteria. Without limitation, these greedy algorithms 152 may be trained using historical optimized operations 148 that include detailed records of past route configurations, segment-level performance, and delivery outcomes. Continuing, by analyzing these records, the network optimizer 130 may learn which greedy selections consistently lead to successful operations. System feedback 150, such as delays encountered, operator reports, or customer satisfaction metrics, may further refine the decision-making logic of the greedy algorithm 152. Additionally and/or alternatively, the network optimizer 130 may be trained in simulated environments that mimic real-world conditions, helping it to adapt to rare or unexpected scenarios and enhance robustness. Without limitation, this combination of adaptive greedy techniques and continuous learning may support highly responsive, context-aware route optimization in dynamic transportation networks. In an embodiment, the greedy algorithm 152 may include various types of algorithms as discussed below.

With continued reference to FIG. 1, as used in this disclosure, a "pure greedy algorithm" is an algorithm that may select the most favorable local option at each step without considering the broader consequences or revisiting prior decisions. The pure greedy algorithm may not require formal training but may be configured through rule-based heuristics, such as prioritizing the shortest distance, lowest cost, or highest priority. In an embodiment, a pure greedy algorithm may be applied to route planning, where a system selects the closest unvisited location at each decision point to complete a delivery sequence. This technique may yield an improvement by reducing computational complexity and execution time when full path optimization is infeasible due to resource constraints or real-time demands.

With continued reference to FIG. 1, as used in this disclosure, a "greedy algorithm with backtracking" is an algorithm that may initially make a local optimal choice but retains the ability to revise prior decisions if a better solution is revealed during execution. The greedy algorithm with backtracking algorithm may incorporate rule-based rollback thresholds or may be trained using historical failure patterns to learn when and how to backtrack. In an embodiment, the greedy algorithm with backtracking may be used in an intelligent dispatch system that initially routes operators based on shortest estimated time but reassigns tasks if delays or cancellations are detected. This method may provide an improvement by enabling partial re-optimization only where necessary, avoiding the overhead of recalculating the entire operational plan.

With continued reference to FIG. 1, as used in this disclosure, a "greedy algorithm with look-ahead" is an algorithm that may evaluate the current local decision along with its estimated effect on future steps before committing. Without limitation, the greedy algorithm with look-ahead may be trained using supervised or reinforcement learning, where the model learns optimal short- and long-term tradeoffs based on historical operational sequences. In an embodiment, the look-ahead algorithm may be deployed in a task scheduling system that evaluates not just immediate execution time but also future resource utilization. For example, without limitation, it may assign a moderately efficient operator to a simple task, reserving a highly efficient operator for an upcoming high-priority task. This approach may improve global performance without sacrificing local responsiveness.

With continued reference to FIG. 1, as used in this disclosure, a "greedy algorithm with memoization" is an algorithm that caches the results of subproblems or decisions for reuse in future similar scenarios. The greedy algorithm with memoization may be trained or tuned by identifying recurring operational patterns and storing optimal decisions or action-value pairs using table-based or learned embeddings. In an embodiment, this approach may be used in a transportation network that frequently processes similar delivery routes. When an identical or near-identical scenario is detected, the greedy algorithm with memoization may reuse a stored optimized path rather than compute a new one. This technique may offer an improvement by reducing computational load and speeding up decision cycles, particularly in high-throughput environments.

With continued reference to FIG. 1, as used in this disclosure, a "minimum temporal datum" is the shortest time value associated with a route segment or an overall route. In an embodiment the minimal temporal datum 154 may include estimated travel times, earliest arrival times, or least delay durations. Without limitation, the minimum temporal datum may serve as a decision-making metric for selecting route segments 138 during the optimization process. As used in this disclosure, an "executed operation" is a previously completed activity involving the multimodal unit 112. In an embodiment, the executed operation 156 is the successful delivery of the multimodal unit 112 to its final destination. As used in this disclosure, "real-time network conditions" are the current operational states and constraints across the transportation network. In an embodiment, the real-time network conditions 158 may influence routing decisions. Without limitation, the real-time network conditions 158 may include live traffic data, weather patterns, infrastructure outages, port queue times, regulatory alerts, dynamic operator 136 availability, and the like. In a non-limiting example, the network optimizer 130 may apply a greedy algorithm 152 to plan a delivery from Dallas to Atlanta. The optimizer evaluates each route segment based on historical executed operations 156 and selects segments with the minimum travel time (minimum temporal datum). Real-time network conditions 158, such as reported traffic congestion and a weather advisory for a segment in Mississippi, prompt the greedy algorithm 152 to avoid that segment, even if it was historically fastest, resulting in a re-optimized route that better suits current conditions. In another non-limiting example, the greedy algorithm 152 may be used to generate a route for a freight train from Denver to Seattle. The network optimizer 130 may access a database of executed operations 156 and find that certain rail segments typically have the least delays early in the day. The network optimizer 130 may select those segments based on their minimum temporal data and adjusts for real-time network conditions 158, such as a maintenance schedule reported using a rail operator API 116, leading to a dynamic, time-efficient route that avoids known bottlenecks.

With continued reference to FIG. 1, the network optimizer 130 further may include monitoring a delay datum 160 of the operator 136 associated with the multimodal unit 112 and reassigning the operator 136 for the multimodal unit 112 based on the delay datum 160. As used in this disclosure, a "delay datum" is information indicative of a temporal deviation associated with the operator 136 of a multimodal unit 112. In an embodiment, the delay datum 160 may include delays in task execution, route completion, or other time-sensitive activities, which may be monitored to inform reassignment or optimization decisions. Without limitation, the delay datum 160 may include metrics such as the amount of time an operator 136 deviates from a scheduled task, the cumulative delay across multiple route segments 138, or response time lags in accepting or executing assignments. For instance, without limitation, the delay datum 160 may reflect that an operator 136 consistently arrives at designated checkpoints later than a target temporal window, or that the operator 136 historical performance reveals a pattern of operational lag under specific network conditions. Without limitation, this information may be derived from system logs, GPS timestamps, or real-time monitoring tools, and may be used by the network optimizer 130 to reassess operator 136 assignments, prioritize more efficient operators 136, or trigger predictive adjustments to future operations. In an embodiment, the network optimizer 130 may monitor a delay datum 160 associated with an operator 136 by tracking discrepancies between projected and actual arrival times at key route checkpoints. For example, without limitation, if an operator 136 is assigned to manage a delivery vehicle and repeatedly arrives at intermediate ports ten to fifteen minutes later than the scheduled arrival time, the system may identify this recurring delay as a delay datum 160. Continuing, based on this information, the network optimizer 130 may optionally reassign a different operator 136 who demonstrates more consistent adherence to target temporal data, thereby improving overall timing accuracy and operational efficiency for subsequent multimodal unit 112 deployments.

With continued reference to FIG. 1, generating the one or more routes 124 of the multimodal unit 112 further may include identifying, using geospatial mapping data 162, the segment parameters 140, wherein the segment parameters 140 further comprise regulatory data 164 and computing, using historical port data 166, projected duration times 168 for each route. As used in this disclosure, "geospatial mapping data" is location-based information representing the physical layout, topology, and attributes of a geographic area. Without limitation, the geospatial mapping data 162 may include road networks, terrain elevations, facility boundaries, environmental zones relevant to routing operations, and the like. As used in this disclosure, "regulatory data" is information reflecting jurisdictional constraints or legal requirements applicable to a specific route segment. In an embodiment, the regulatory data 164 may include vehicle access restrictions, port entry limitations, curfews, emission control regulations, and the like. As used in this disclosure, "historical port data" is archived operational data collected from one or more port nodes 120 over time. Without limitation, the historical port data 166 may include average docking times, berth availability, congestion patterns, customs processing durations, and the like. As used in this disclosure, "projected duration times" are estimated time intervals calculated for traversing route segments 138 or completing port-based operations. In an embodiment, the projected duration times 168 may be derived from historical performance metrics, real-time inputs, or both. For example, without limitation, the geospatial mapping data 162 may include a digital elevation model of a port region and a map of road access points leading to multimodal terminals, which may assist in determining feasible route paths. Continuing, the regulatory data 164 may include a city ordinance restricting freight vehicles from using certain roads during peak commuter hours, or a customs requirement mandating preclearance procedures before entry. Without limitation, the historical port data 166 may capture trends showing that Container Terminal A typically has a two-hour average wait time for unloading during weekday mornings. In an embodiment, projected duration times 168 may be computed to estimate a total of five hours for route completion, factoring in access roads, port processing time, and anticipated operator delays. In another non-limiting example, generating a route for a cargo vessel may include identifying, using geospatial mapping data 162, a segment leading through a narrow canal and applying regulatory data 164 that restricts vessel width, thereby limiting the available vessels assignable to the segment. In another embodiment, the network optimizer 130 may access historical port data 166 indicating longer processing delays at Port X during early afternoons and use that data to compute projected duration times 168 favoring alternate arrival windows or different port assignments entirely.

Still referring to FIG. 1, processor 102 is configured to generate, using the network optimizer 130, an optimized operation 192 using the optimized route 132 and the assignment 134 of the operator 136. As used in this disclosure, an "optimized operation" is a coordinated execution strategy for a multimodal unit 112 that is generated as a function of an optimized route 132 and a selected operator 136 assignment, wherein the strategy is tailored to achieve improved performance outcomes such as reduced delays, enhanced resource utilization, or increased adherence to temporal constraints. Without limitation, the optimized operation 192 may encompass a broader strategic execution of the optimized route 132, integrating not only the optimized route 132 itself but also additional operational factors such as the assignment 134 of an operator 136, timing coordination, capacity utilization, and compliance with regulatory or logistical constraints. For example, without limitation, the optimized operation 192 may include dispatching a cargo truck along a dynamically selected route that minimizes exposure to known traffic bottlenecks while assigning an operator 136 with a strong historical performance on similar routes, thereby reducing delivery time. In another non-limiting example, the optimized operation 192 may involve routing a shipping vessel through ports with historically lower processing delays while selecting an operator 136 who has received high performance scores based on recent system feedback 150, thereby improving turnaround efficiency and maintaining alignment with target arrival windows.

With continued reference to FIG. 1, further may include generating, using the network optimizer 130, one or more subsequent optimized operations 170 based on user feedback 172 received using the graphical user interface 174 of the downstream device 176. As used in this disclosure, "subsequent optimized operations" are refined or follow-on execution strategies generated by the network optimizer 130 after an initial optimized operation 192. Without limitation, the subsequent optimized operation 170 may include and updated strategy incorporate additional data inputs such as performance outcomes or feedback received from users, thereby enabling iterative improvement over time. As used in this disclosure, "user feedback" is data provided by a user through a graphical user interface 174. In an embodiment, the user feedback 172 may include evaluations, performance ratings, error reports, delay justifications, manual adjustments to the proposed operation, and the like, and may be used to inform and improve future operational decisions. For example, without limitation, the user may submit user feedback 172 through the graphical interface indicating that a previously suggested operator 136 was unfamiliar with the selected route, causing delays, which may prompt the network optimizer 130 to deprioritize that operator 136 in future assignments 134 for similar routes. In another example, user feedback 172 may include manual edits to the projected arrival timeline or segment prioritization preferences, allowing the system to generate subsequent optimized operations 170 that better align with real-world execution patterns or user-specific constraints. In another non-limiting example, a user may interact with the graphical user interface 174 to update the target temporal datum 126 to an earlier arrival time due to a last-minute change in delivery requirements or port availability. Upon receiving this user feedback 172, the network optimizer 130 may generate a subsequent optimized operation 170 by identifying a faster route with fewer intermediate stops, prioritizing segments with historically lower congestion, and reassigning an operator 136 known for rapid execution. Continuing, this updated operation may enable the multimodal unit 112 to meet the revised time constraint while maintaining regulatory compliance and operational efficiency.

Still referring to FIG. 1, processor 102 is configured to display, using a graphical user interface 174 of a downstream device 176, a visualization 178 of the optimized operation 192. As used in this disclosure, "downstream device" is a device that accesses and interacts with apparatus 100. For instance, and without limitation, downstream device 176 may include a remote device and/or apparatus 100. In a non-limiting embodiment, downstream device 176 may be consistent with a computing device as described in the entirety of this disclosure. Without limitation, the downstream device 176 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the optimized operation 192 may include displaying the optimized operation 192 at display device using a visual interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 174. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface 174 and an event handler may operate together to enable seamless interaction between the user and the apparatus 100. The GUI serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler May detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying output, modifying visual elements, or providing real-time feedback. Together, the GUI and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface 174. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device 176 may include a data structure. With continued reference to FIG. 1, as used in this disclosure, "data structure" is a way of organizing data represented in a specialized format on a computer configured such that the information can be effectively presented in a graphical user interface 174. In some cases, the data structure includes any input data. In some cases, the data structure contains data and/or rules used to visualize the graphical elements within a graphical user interface 174. In some cases, the data structure may include any data described in this disclosure. In some cases, the data structure may be configured to modify the graphical user interface 174, wherein data within the data structure may be represented visually by the graphical user interface 174. In some cases, the data structure may be continuously modified and/or updated by processor 102, wherein elements within graphical user interface 174 may be modified as a result. In some cases, processor 102 may be configured to transmit display device and or the downstream device 176 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user interacts with a dropdown menu in the GUI to select a topic, the event handler may capture this input and accesses a data structure, such as a dictionary or tree, that maps each topic to its associated resources or actions. The data structure may retrieve the relevant information such as, text explanations, videos, or interactive exercises, and passes it back to the event handler, which may then trigger the appropriate updates to the GUI, such as displaying the selected topic's content. In another embodiment, the data structure may also maintain the state of the system, tracking user progress, preferences, and session history. For instance, without limitation, a hash table May store user specific configurations, such as preferred learning styles or recent activity, which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface 174 that allows users to perform actions, provide input, or engage with the apparatus 100. Interactive elements may be designed to facilitate two-way communication between the user and the system, enabling the user to influence the behavior of the apparatus or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real-time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs 116 may act as a bridge between the front end and back end, facilitating data transfer, such as sending a user's form submission to the server and retrieving processed results. Server-side logic, implemented using languages like Python, Java, or Node.js, may handle input processing and return relevant data, such as a user's profile or quiz questions. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs 116.

With continued reference to FIG. 1, as used in this disclosure, a "visualization" is a graphical or interactive representation of data rendered on a user interface. In an embodiment, the visualization 178 may convey complex system outputs, such as optimized operations 192, in an intuitive, accessible format for user interpretation and decision-making.

With continued reference to FIG. 1, generating the visualization 178 of the optimized operation 192 may include a dashboard 180, wherein the dashboard 180 displays a unique identifier 182 of the multimodal unit 112, a present geolocation 184 of the multimodal unit 112, the plurality of route segments 138 associated with the multimodal unit 112, and the real-time data 128 associated with the multimodal unit 112. As used in this disclosure, a "dashboard" is an interactive user interface component configured to consolidate and present key operational data in a visually structured layout. In an embodiment, the dashboard 180 may enable users to monitor, interpret, and manage various aspects of the status of the multimodal unit 112 in real-time. As used in this disclosure, a "unique identifier" is a distinct alphanumeric code or label assigned to a specific multimodal unit 112. In an embodiment, the unique identifier 182 may serve to differentiate each multimodal unit 112 from other units in the system and may enable traceability across operations. As used in this disclosure, a "present geolocation" is the current geographic position of the multimodal unit 112. In an embodiment, the present geolocation 184 may be represented by coordinates or location metadata derived from GPS or other positioning systems, and updated in real-time. For example, the dashboard 180 may display a multimodal unit 112 labeled "ID-8472" traveling through Segment 4 of a port corridor, showing its present geolocation 184 live as latitude 42.361 and longitude −71.057, overlaid on a digital route map alongside timestamps and environmental data. In another non-limiting example, the dashboard 180 may list the unique identifier 182 of a railcar in a container network, highlight its current location within a terminal, and show predicted handoff timing based on current throughput rates. In another embodiment, the dashboard 180 may provide a live overview of multiple units, each tagged by unique identifier 182. Continuing, the geolocation 122 of one multimodal unit 112 may trigger a real-time alert due to deviation from its assigned segment path, prompting operator 136 intervention.

In another embodiment, the dashboard 180 may provide a live, system-wide overview of multiple multimodal units 112 simultaneously engaged in different operations, with each unit displayed alongside its unique identifier 182, such as "TRK-0093" or "VES-1121." The unique identifiers 182 may allow users, such as fleet managers, logistics coordinators, or port operators 136, to instantly distinguish between assets and monitor their individual progress in real-time. The dashboard 180 may visually represent each unit's route as a sequence of color-coded segments overlaid on a digital map, and continuously update the present geolocation 184 of each unit based on GPS or onboard telemetry. When a specific multimodal unit 112, such as a cargo truck traveling along Segment 5, strays from its assigned route due to a detour, driver error, or environmental disruption, the dashboard 180 may detect a mismatch between the expected and actual geolocation. This deviation may trigger a real-time alert, such as a red notification banner or pop-up message, informing the operator 136 or control room personnel that immediate action may be necessary to preserve timing precision or regulatory compliance. The alert may include contextual details such as how far the unit has deviated, the estimated impact on delivery windows, and any nearby alternative route segments 138. Without limitation, the operator 136 may use the dashboard 180 to intervene, either by remotely rerouting the multimodal unit 112 to the nearest viable segment using embedded control features or by contacting the assigned operator 136 directly with updated instructions. The apparatus 100 may automatically update the projected duration times 168 and re-optimize affected portions of the operation. Without limitation, this type of real-time exception management supports the broader goal of ensuring that multimodal operations remain on schedule, aligned with constraints, and resilient to unplanned disruptions.

With continued reference to FIG. 1, displaying the optimized operation 192 using the graphical user interface 174 may include generating a visual map 186 indicating the optimized route 132 of the multimodal unit 112, displaying a timeline interface 188 showing projected arrival time 190, and presenting the assignment 134 of the operator 136. As used in this disclosure, a "visual map" is a digital representation rendered within a graphical user interface 174 that depicts geographical features, route segments 138, and dynamic overlays. In an embodiment, the visual map 186 may be designed to indicate the optimized route 132 of a multimodal unit 112, which may include using waypoints, directional flow, and location-based annotations. For example, without limitation, the visual map 186 may show a route from Port Newark to a Midwest logistics hub, with each segment color-coded by estimated delay and overlaid with real-time geolocation markers of the unit. As used in this disclosure, a "timeline interface" is a graphical element within the user interface that presents a sequential, time-based view of planned and actual milestones throughout the course of an operation. For example, without limitation, the timeline interface 188 may depict key events such as departure, expected arrival at waypoints, and final delivery of the multimodal unit 112, plotted along a linear bar with indicators for early, on-time, or delayed status. As used in this disclosure, a "projected arrival time" is a system-generated estimate of when a multimodal unit 112 is expected to reach a specified location or complete a route. Without limitation, the projected arrival time 190 may be calculated using historical data, real-time conditions, routing parameters, and the like. For example, the projected arrival time 190 at Port of Los Angeles may be listed as 14:35 PST, with an on-screen indicator reflecting whether this time is within the expected window.

Still referring to FIG. 1, processor 102 is configured to execute the optimized operation 192. As used in this disclosure, "executing" is to initiate, enable, or perform one or more downstream tasks or actions derived from the optimized operation generated by the processor. Execution may be carried out automatically or in conjunction with human oversight, depending on system configuration, operational context, or user-defined preferences. In a non-limiting example, executing the optimized operation 192 may involve automatically triggering downstream events across networked components or logistics chains. For instance, without limitation, if the optimized operation involves a revised delivery route for a multimodal freight unit, executing the optimized operation 192 may automatically dispatch new travel instructions to the vehicle's onboard navigation system, send alerts to port authorities about adjusted arrival times, or trigger container repositioning protocols at the destination port. This form of execution may reduce latency and enhance real-time responsiveness across operational nodes. Additionally and/or alternatively, executing the optimized operation 192 may be subject to human-in-the-loop review, where a user, such as a fleet manager or logistics operator, receives the optimized operation 192 through a graphical user interface 174 and may be prompted to confirm, reject, or adjust certain parameters before activation. In a non-limiting example, the operator may manually approve a change in arrival time that impacts labor scheduling at a docking facility or may override a route segment due to local knowledge of construction delays not captured by the network optimizer. In such a configuration, execution is conditional on user validation, enabling adaptive control while maintaining human agency. Execution may also include partial automation, where certain segments of the operation are deployed immediately while others await additional data or approvals. For example, without limitation, the apparatus 100 may automatically optimize and implement initial route segments while deferring execution of later stages until real-time weather data becomes available or until crew availability is confirmed.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2A:
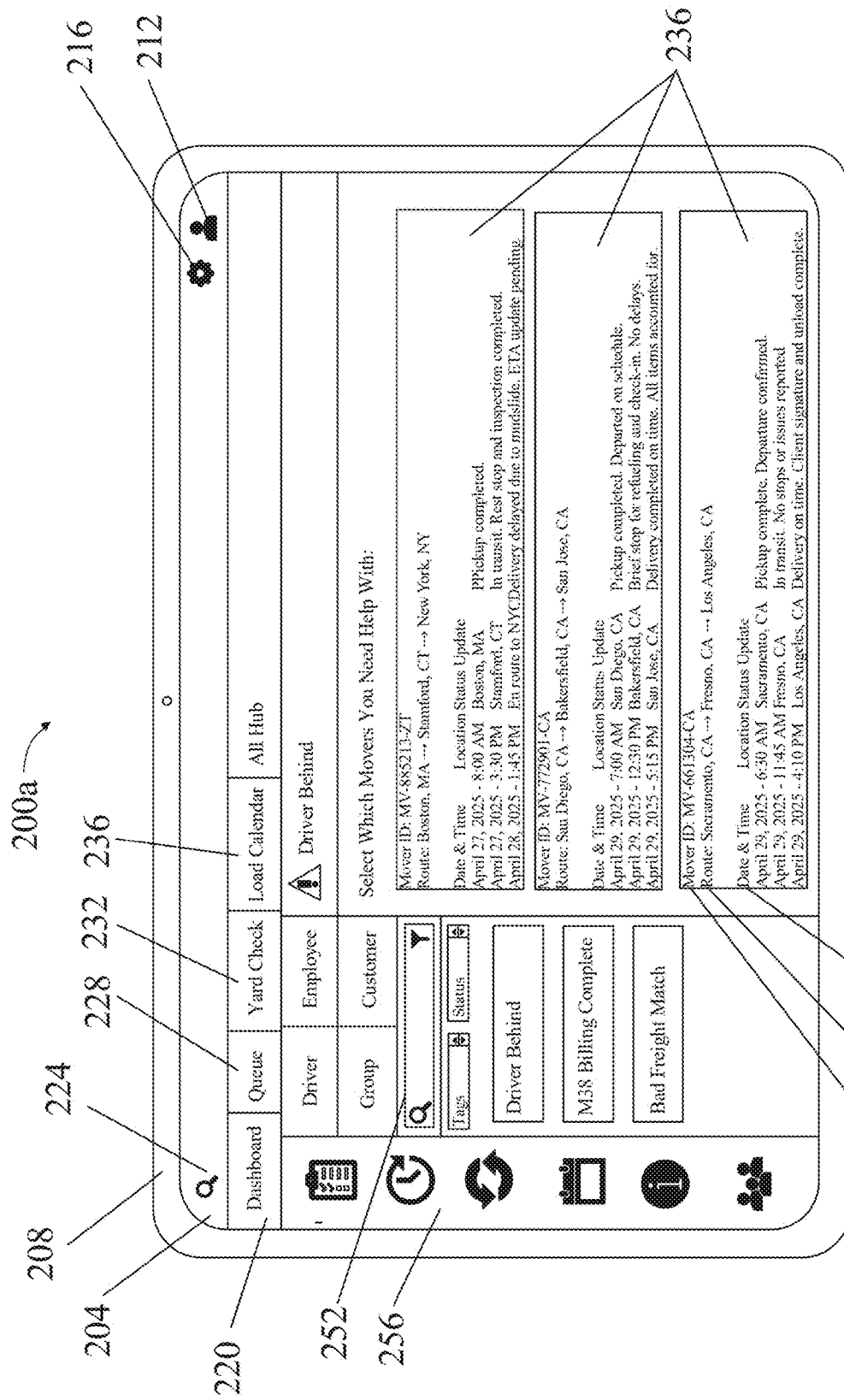
FIG. 2A is an illustration of a graphical user interface with a visualization.

Referring now to FIG. 2A, an illustration 200a of a graphical user interface with a visualization. In an embodiment, the illustration 200a may include a graphical user interface 204. In an embodiment, the illustration 200a may include the graphical user interface 204 displayed on a downstream device 208. In an embodiment, the graphical user interface 204 may include a user profile 212. In an embodiment, the settings icon 216 may allow the user to configure system preferences. For example, selecting the settings icon 216 may enable toggling between real-time route updates and manual refresh, adjusting notification frequencies, or managing alert thresholds. In an embodiment, the graphical user interface 204 may include a settings icon 216. In an embodiment, the settings icon 216 may allow the user to configure system preferences. For example, selecting the settings icon 216 may enable toggling between real-time route updates and manual refresh, adjusting notification frequencies, or managing alert thresholds. In an embodiment, the graphical user interface 204 may include a dashboard tab 220. In an embodiment, the dashboard tab 220 may provide a high-level summary of operational status. For example, the dashboard tab 220 may display key performance indicators such as the number of active movers, delayed shipments, and current yard occupancy percentages. In an embodiment, the graphical user interface 204 may include a search bar 224. In an embodiment, the search bar 224 may allow a user to locate specific entities, such as mover IDs, route numbers, or scheduled tasks. For example, a dispatcher may use the search bar 224 to retrieve details about a specific multimodal unit's progress along a route 244. In an embodiment, the graphical user interface 204 may include a queue tab 228. In an embodiment, the queue tab 228 may display a list of pending or scheduled tasks awaiting execution. For example, the queue tab 228 may list upcoming load assignments that require mover confirmation or operator approval. In an embodiment, the graphical user interface 204 may include a yard check tab 232. In an embodiment, the yard check tab 232 may allow a user to monitor equipment status and placement within a freight yard. For example, selecting the yard check tab 232 may display which units are idle, docked, or awaiting unloading. In an embodiment, the graphical user interface 204 may include a load calendar tab 236. In an embodiment, the load calendar tab 236 may present a visual timeline of scheduled loading activities. For example, the load calendar tab 236 may help optimize scheduling by showing which time slots are already booked and which remain available for new assignments. In an embodiment, the graphical user interface 204 may include a mover ID 240. In an embodiment, the mover ID 240 may identify a specific driver or automated mover system assigned to a route. For example, the mover ID 240 may link to performance history or training records of a human operator or status logs for an autonomous vehicle. In an embodiment, the graphical user interface 204 may include a route 244. In an embodiment, the route 244 may visually depict a planned or optimized operation 192. For example, the route 244 may show the real-time location of the multimodal unit, with color-coded segments indicating completed, active, or delayed route sections. In an embodiment, the graphical user interface 204 may include a date and time 248. In an embodiment, the date and time 248 may indicate the timestamp associated with a task, route, or update. For example, date and time 248 may show the expected arrival time for a delivery or the last time a load was scanned into the system. In an embodiment, the graphical user interface 204 may include a local search 252. In an embodiment, the local search 252 may enable targeted queries within a defined geographic or operational scope. For example, local search 252 may allow a yard manager to find all active movers within a 20-mile radius of a port node. In an embodiment, the graphical user interface 204 may include a side dashboard 256. In an embodiment, the side dashboard 256 may provide contextual or secondary information related to the active tab. For example, the side dashboard 256 may show a real-time weather feed, a list of recent alerts, or a summary of compliance checks for the currently selected route 244. In an embodiment, the side dashboard 256 may include a checklist tracker configured to display task completion status for active operations, such as route confirmations, yard checks, or compliance steps. In an embodiment, the side dashboard 256 may include a historical page configured to present records of past deliveries, including route numbers, timestamps, and associated mover IDs 240. In an embodiment, the side dashboard 256 may include a calendar view configured to provide a visual schedule of upcoming, ongoing, and completed operations, optionally synchronized with the load calendar tab 236. In an embodiment, the side dashboard 256 may include an information icon configured to provide context-sensitive help, tooltips, or system guidance related to the selected task or interface element. In an embodiment, the side dashboard 256 may include a refresh or update icon configured to manually trigger data synchronization with a central database or backend system, thereby ensuring the latest operational data is presented. In an embodiment, the side dashboard 256 may include a resource utilization display configured to show real-time or historical metrics indicating how system resources, such as movers, loading bays, or personnel, are currently allocated and utilized.

Figure 2B:
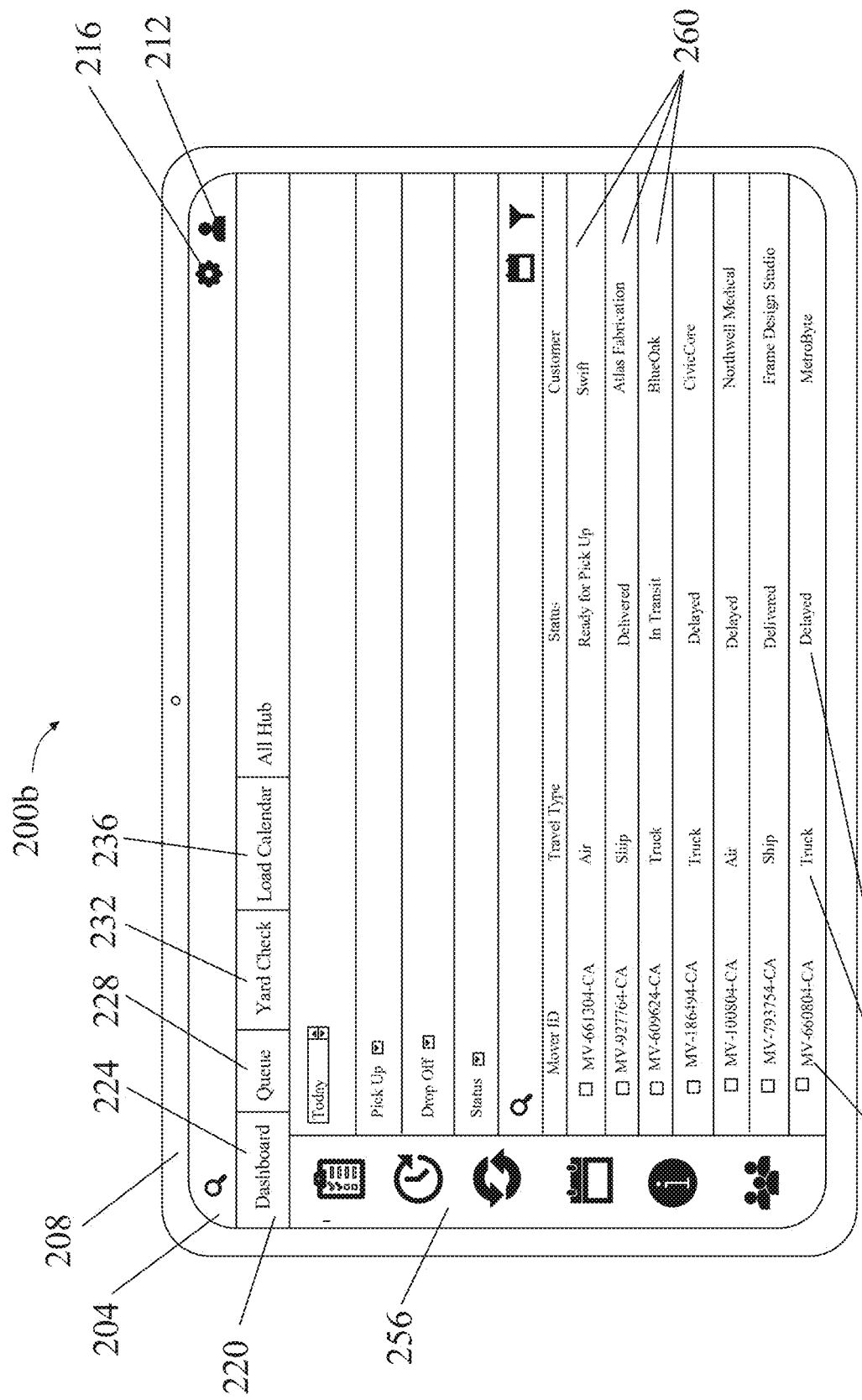
FIG. 2B is an illustration of a graphical user interface with a visual map and timeline interface.

Referring now to FIG. 2B, an illustration 200b of a graphical user interface with a visual map and timeline interface. In an embodiment, the graphical user interface 204 may include a customer field 260. In an embodiment, the customer field 260 may be configured to display customer-specific information related to a given operation, such as the customer name, account ID, contact details, or service-level requirements. In an embodiment, the customer field 260 may allow a user to edit or select a customer from a dropdown menu, auto-populate related shipment data, or link directly to the customer's historical activity log. In an embodiment, the customer field 260 may be integrated with search bar 224 or local search 252 to filter operations by customer identity or preference tags. In an embodiment, the graphical user interface 204 may include description columns 624. In an embodiment, the description columns 624 may be configured to display descriptive metadata associated with each entry in a dashboard tab 220, queue tab 228, or load calendar tab 236. In an embodiment, the description columns 624 may include text fields outlining delivery instructions, route characteristics, cargo content summaries, or notes entered by an operator. In an embodiment, the description columns 624 may be sortable or filterable based on criteria such as priority level, task type, or mover ID 240, allowing users to quickly assess key details across multiple operational rows.

Figure 3:
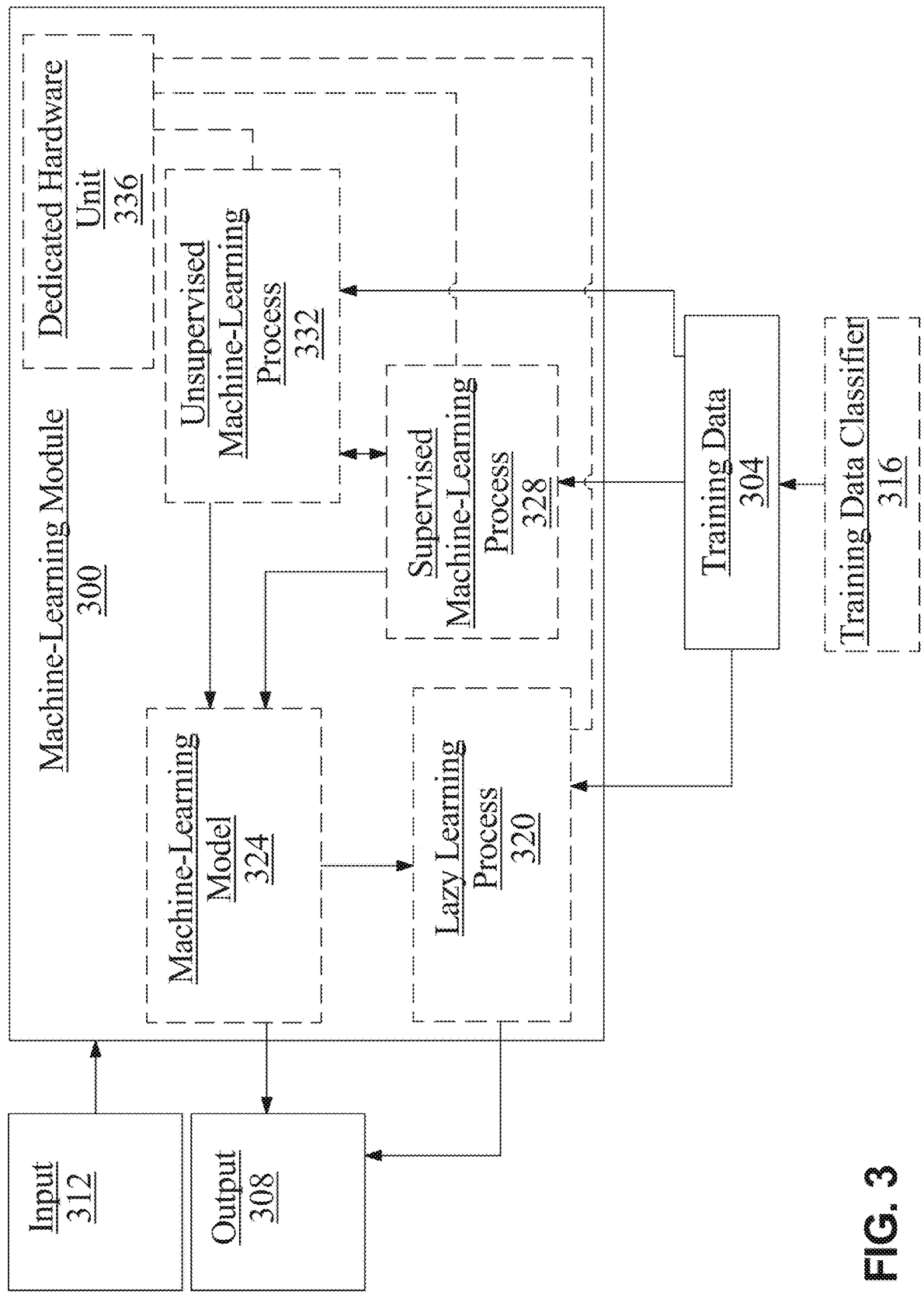
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, the input data used by training data 304 may include historical route performance metrics, geolocation logs, segment-specific regulatory constraints, operator delay patterns, real-time weather conditions, and capacity constraints of the multimodal unit. The corresponding output data may include optimized route selections, predicted delay likelihoods, operator assignment recommendations, projected arrival times, and efficiency scores for specific route segments. This input-output mapping may enable machine-learning module 300 to identify patterns and generate optimized operations that are responsive to dynamic environmental and operational variables.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to sub-populations such as operators exhibiting consistent on-time performance under high-traffic conditions, multimodal unit delivery in coastal regions, or route segments historically impacted by seasonal regulatory constraints. This classification may enable the system to isolate subsets of data that share meaningful operational traits, allowing the machine-learning module to develop targeted models or predictive outputs tailored to specific scenarios or environmental contexts.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $\alpha_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25th percentile value and the 50th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as historical geolocation data, operator delay patterns, segment-specific regulatory data, and weather conditions, as described above, and may generate outputs such as projected arrival times, optimized route selections, or operator reassignment recommendations, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
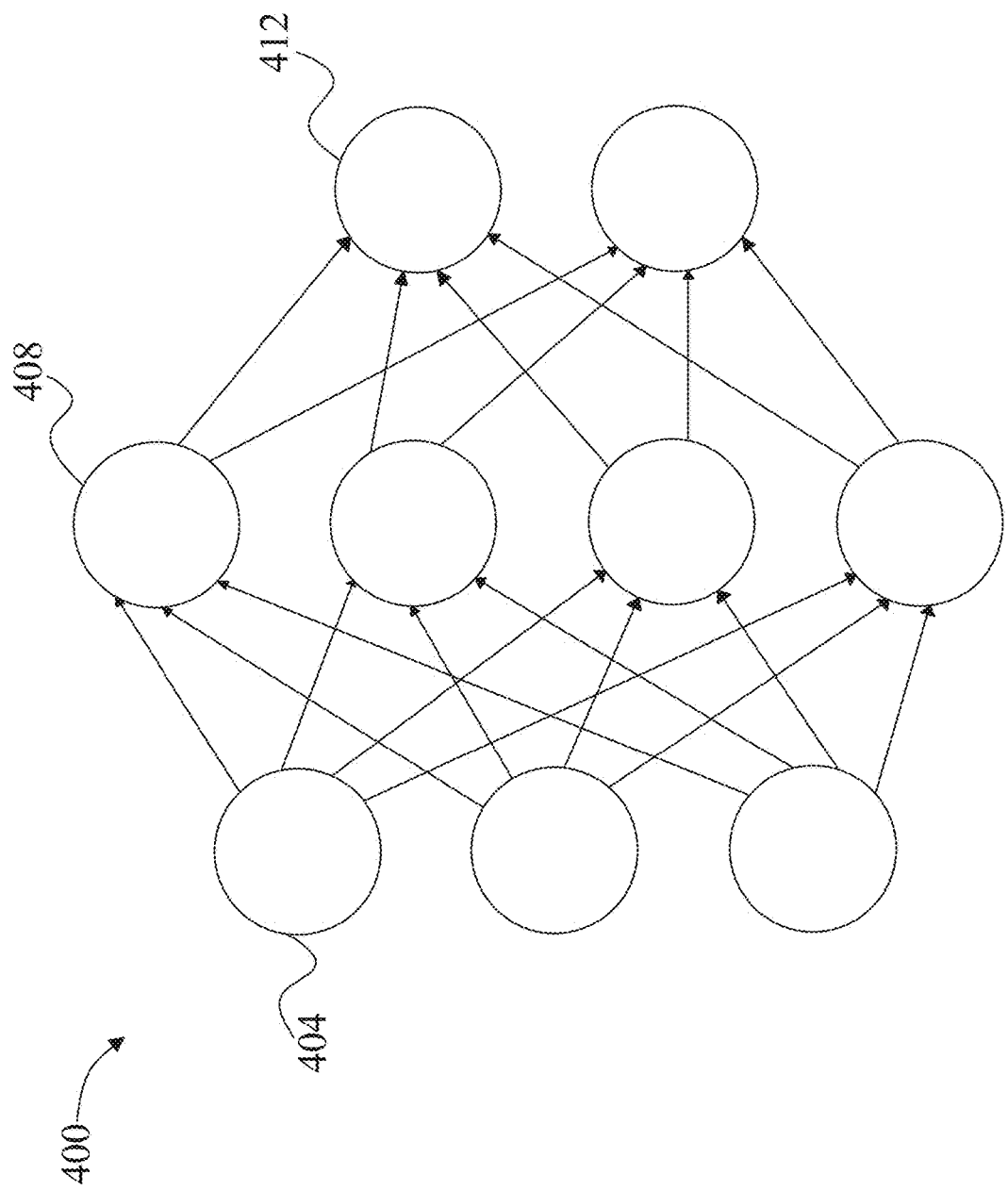
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
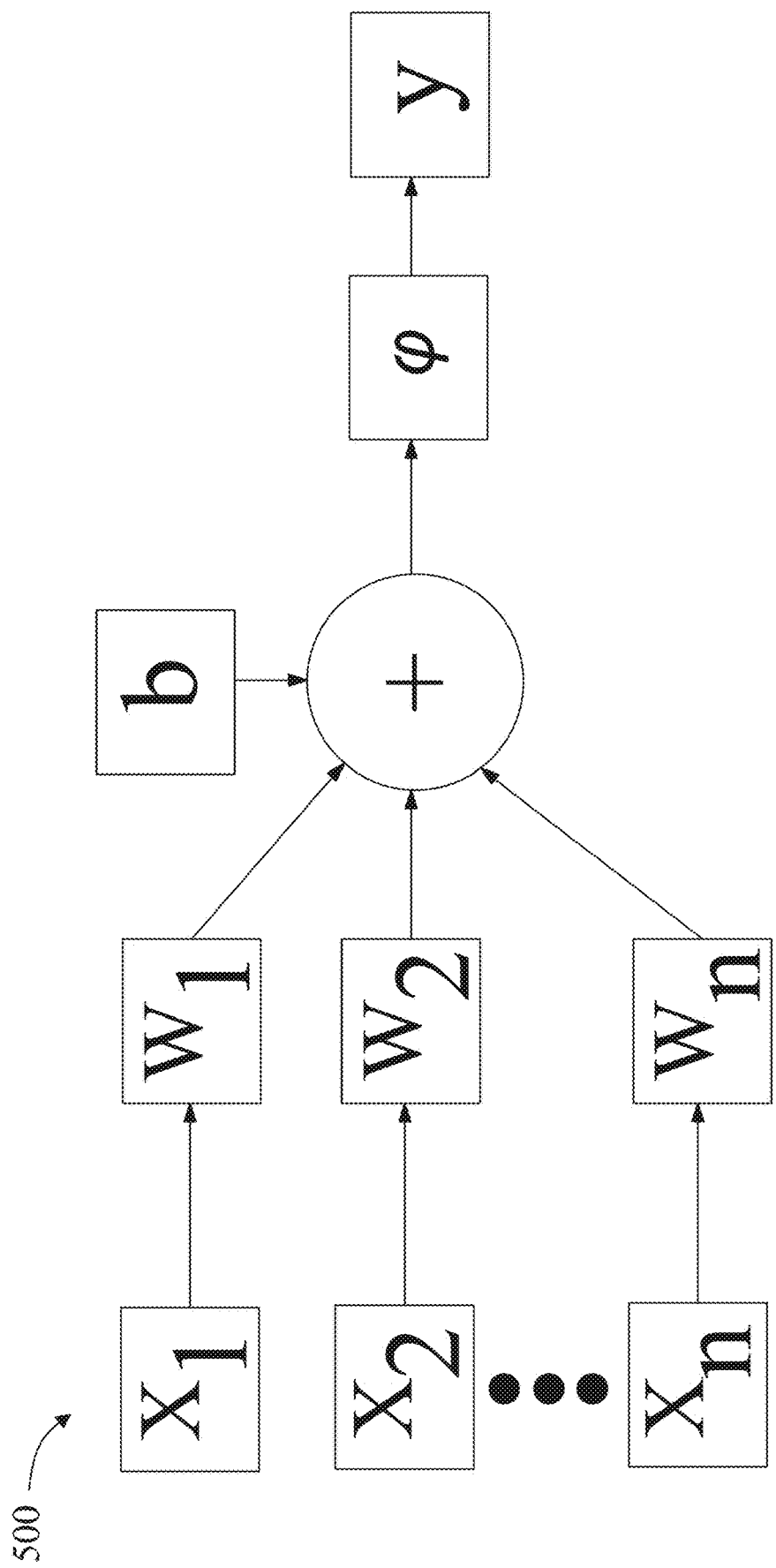
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a $\tanh^2$(hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(\alpha x, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha$ (1+tanh ($\sqrt{2/\pi}(x+bx^r)$)) for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function q, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
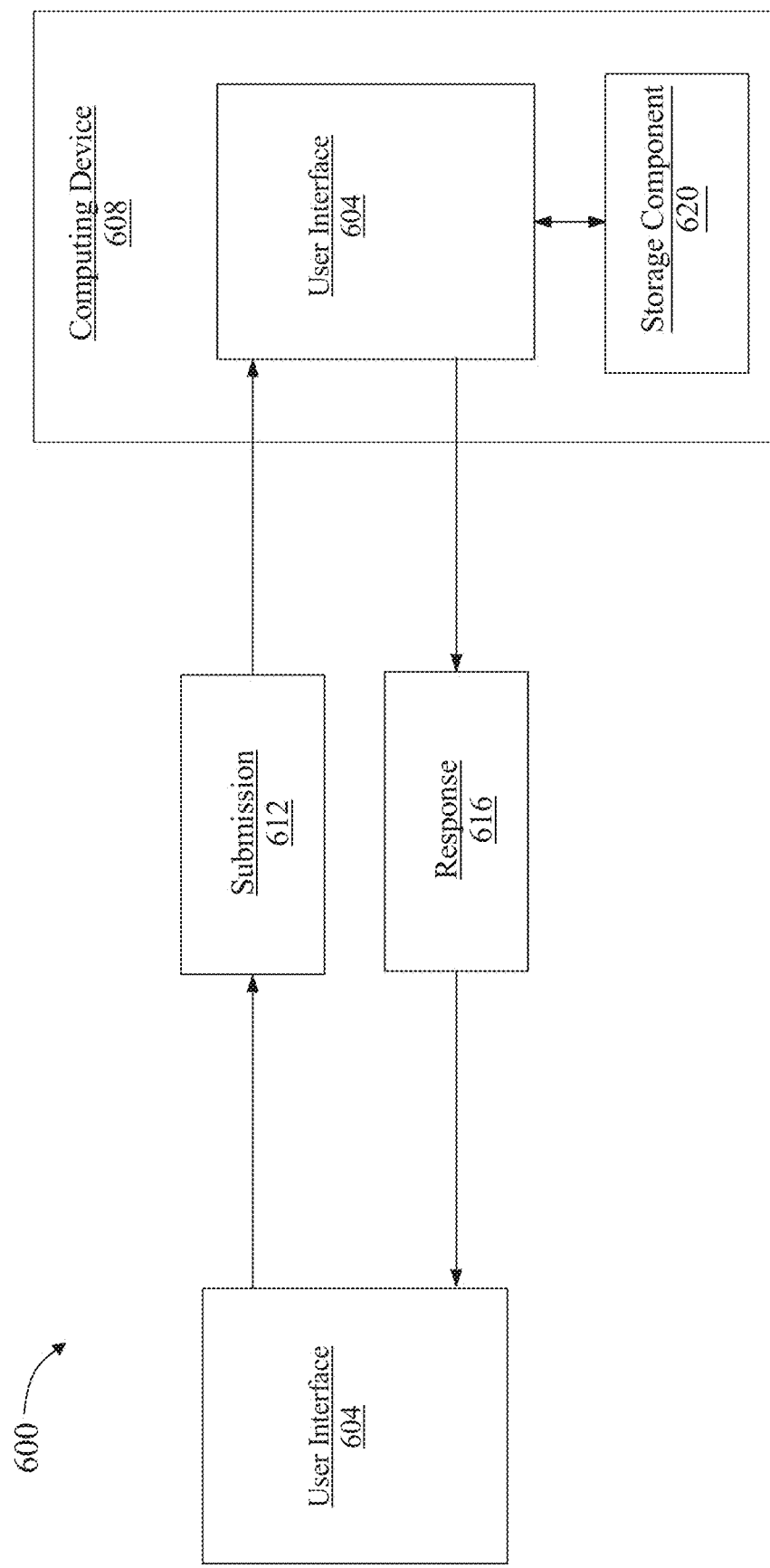
FIG. 6 is a diagram of an exemplary embodiment of a chatbot.

Referring now to FIG. 6, a chatbot system 600 is schematically illustrated. According to some embodiments, a user interface 604 may be communicative with a computing device 608 that is configured to operate a chatbot. In some cases, user interface 604 may be local to computing device 608. Alternatively or additionally, in some cases, user interface 604 may remote to computing device 608 and communicative with the computing device 608, by way of one or more networks, such as without limitation the internet. Alternatively or additionally, user interface 604 may communicate with computing device 608 using telephonic devices and networks, such as without limitation fax machines, short message service (SMS), or multimedia message service (MMS). Commonly, user interface 604 communicates with computing device 608 using text-based communication, for example without limitation using a character encoding protocol, such as American Standard for Information Interchange (ASCII). Typically, a user interface 604 conversationally interfaces a chatbot, by way of at least a submission 612, from the user interface 604 to the chatbot, and a response 616, from the chatbot to the user interface 604. In many cases, one or both submission 612 and response 616 are text-based communication. Alternatively or additionally, in some cases, one or both of submission 612 and response 616 are audio-based communication.

Continuing in reference to FIG. 6, a submission 612 once received by computing device 608 operating a chatbot, may be processed by a processor 620. In some embodiments, processor 620 processes submission 612 using one or more of keyword recognition, pattern matching, and natural language processing. In some embodiments, processor employs real-time learning with evolutionary algorithms. In some cases, processor 620 may retrieve a pre-prepared response from at least a storage component 624, based upon submission 612. Alternatively or additionally, in some embodiments, processor 620 communicates a response 616 without first receiving a submission 612, thereby initiating conversation. In some cases, processor 620 communicates an inquiry to user interface 604; and the processor is configured to process an answer to the inquiry in a following submission 612 from the user interface 604. In some cases, an answer to an inquiry present within submission 612 from a computing device 608 may be used by computing device 608 as an input to another function.

Figure 7:
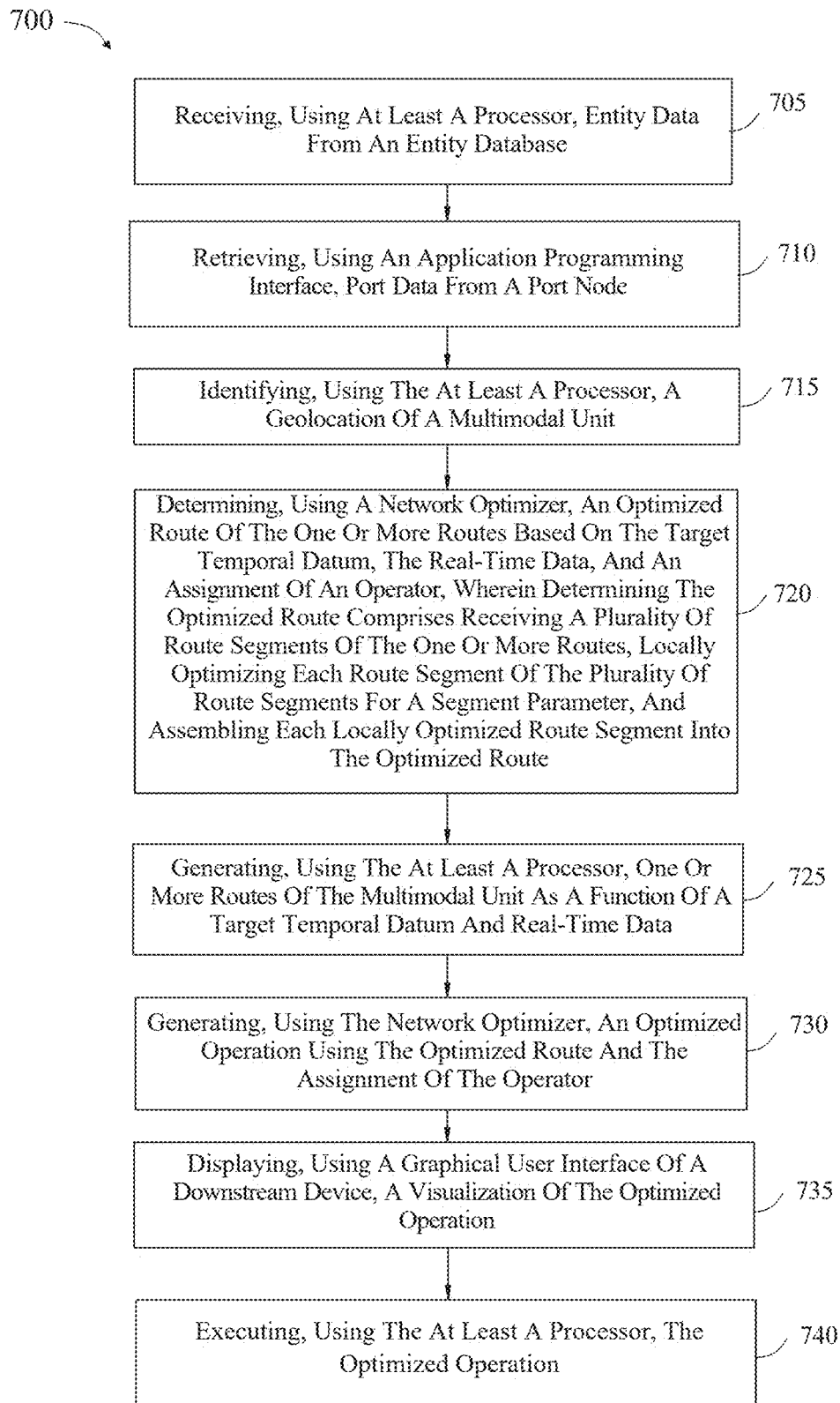
FIG. 7 is a block diagram of an exemplary method for generating an optimized operation of a multimodal unit as a function of a network optimizer.

Referring now to FIG. 7, a flow diagram of an exemplary method 700 for generating an optimized operation of a multimodal unit as a function of a network optimizer is illustrated. At step 705, method 700 includes receiving, using at least a processor, entity data from an entity database. In an embodiment, the entity data may include identification information associated with the multimodal unit and capacity constraints of the multimodal unit. This may be implemented as described and with reference to FIGS. 1-6.

Still referring to FIG. 7, at step 710, method 700 includes retrieving, using an application programming interface, port data from a port node. This may be implemented as described and with reference to FIGS. 1-6.

Still referring to FIG. 7, at step 715, method 700 includes identifying, using the at least a processor, a geolocation of a multimodal unit. This may be implemented as described and with reference to FIGS. 1-6.

Still referring to FIG. 7, at step 720, method 700 includes generating, using the at least a processor, one or more routes of the multimodal unit as a function of a target temporal datum and real-time data. This may be implemented as described and with reference to FIGS. 1-6.

Still referring to FIG. 7, at step 725, method 700 includes determining, using a network optimizer, an optimized route of the one or more routes based on the target temporal datum, the real-time data, and an assignment of an operator, wherein determining the optimized route comprises receiving a plurality of route segments of the one or more routes, locally optimizing each route segment of the plurality of route segments for a segment parameter, and assembling each locally optimized route segment into the optimized route. In an embodiment, assigning, using the network optimizer, the operator further may include applying, using the at least a processor, a ranked system comprising entity preferences associated with the operator. In an embodiment, the network optimizer is trained using training data may include historical optimized operations and associated with system feedback. In an embodiment, the network optimizer further may include a greedy algorithm, the greedy algorithm configured to select each route segment based on a minimum temporal datum associated with an executed operation of the multimodal unit, and generate the optimized operation based on real-time network conditions. In an embodiment, the network optimizer further may include monitoring a delay datum of the operator associated with the multimodal unit and reassigning the operator for the multimodal unit based on the delay datum. In an embodiment, generating the one or more routes of the multimodal unit further may include identifying, using geospatial mapping data, routing parameters, wherein the segment parameters further comprise regulatory data and computing, using historical port data, projected duration times for each route. This may be implemented as described and with reference to FIGS. 1-6.

Still referring to FIG. 7, at step 730, method 700 includes generating, using the network optimizer, an optimized operation using the optimized route and the assignment of the operator. In an embodiment, further may include generating, using the network optimizer, one or more subsequent optimized operations based on user feedback received using the graphical user interface of the downstream device. This may be implemented as described and with reference to FIGS. 1-6.

Still referring to FIG. 7, at step 735, method 700 includes displaying, using a graphical user interface of a downstream device, a visualization of the optimized operation In an embodiment, generating the visualization of the optimized operation may include a dashboard, wherein the dashboard displays a unique identifier of the multimodal unit, a present geolocation of the multimodal unit, the plurality of route segments associated with the multimodal unit, and real-time data associated with the multimodal unit. This may be implemented as described and with reference to FIGS. 1-6.

Still referring to FIG. 7, at step 740, method 700 includes executing, using the at least a processor, the optimized operation. This may be implemented as described and with reference to FIGS. 1-6.

In an embodiment, displaying the optimized operation using the graphical user interface may include generating a visual map indicating the optimized route of the multimodal unit, displaying a timeline interface showing projected arrival time, and presenting the assignment of the operator. This may be implemented as described and with reference to FIGS. 1-6. It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
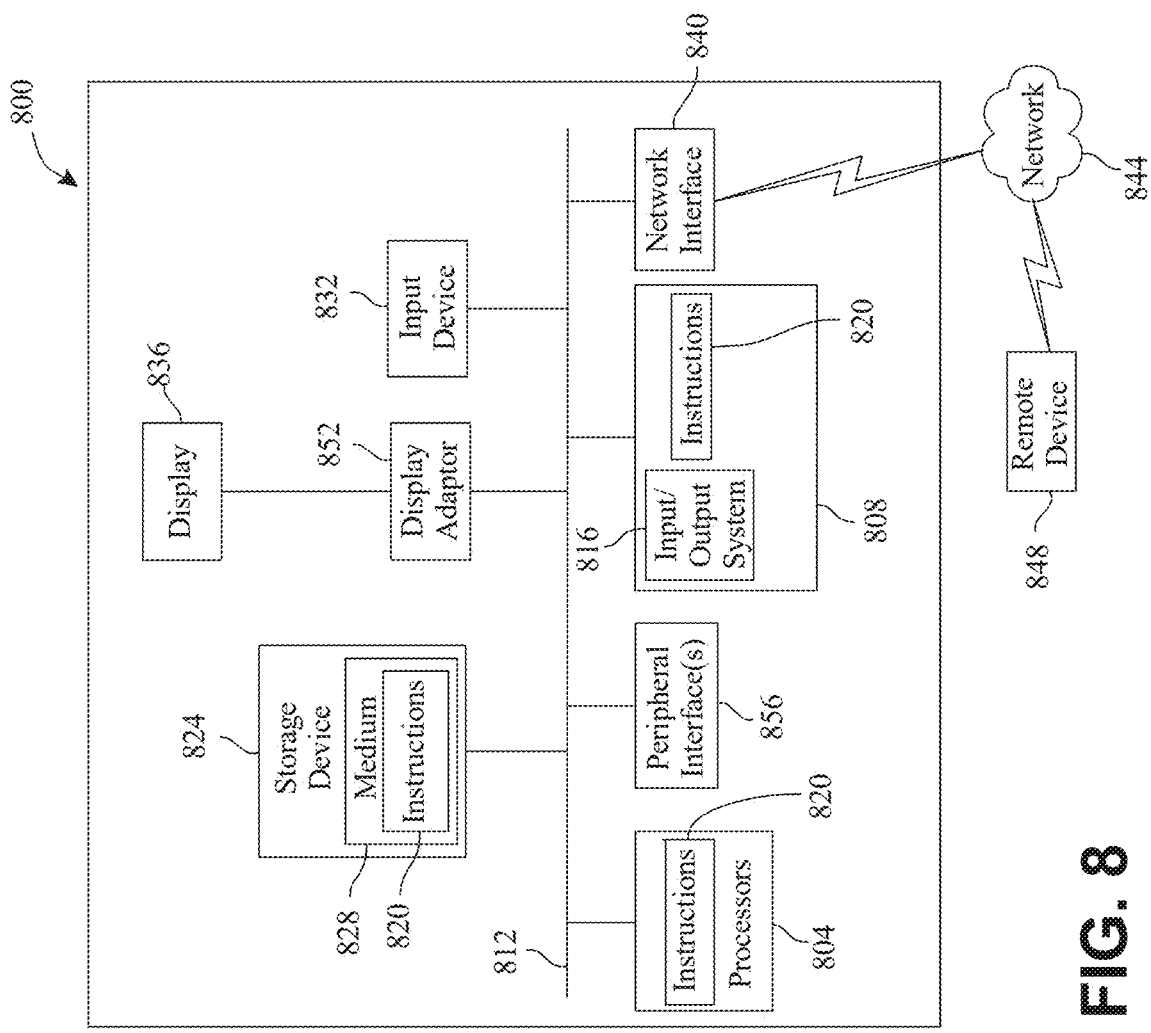
FIG. 8 is a block diagram of a computing system that can be used to implement any one or more of the methodologies disclosed herein and any one or more portions thereof.

FIG. 8 shows a diagrammatic representation of one embodiment of computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an optimized operation of a multimodal unit as a function of a network optimizer, wherein the apparatus comprises:
   at least a computing device, wherein the computing device comprises:
      a memory; and
      at least a processor communicatively connected to the memory, wherein the memory contains instructions configuring the at least a processor to:
         receive, using the at least a processor, entity data from an entity database;
         retrieve, using an application programming interface, port data from a port node;
         identify, using the at least a processor, a geolocation of a multimodal unit;
         generate, using the at least a processor, one or more routes of the multimodal unit as a function of a target temporal datum and real-time data;
         determine, using a network optimizer, an optimized route of the one or more routes based on the target temporal datum, the real-time data, and an assignment of an operator, wherein determining the optimized route comprises:
            receiving a plurality of route segments of the one or more routes;
            locally optimizing each route segment of the plurality of route segments for a segment parameter; and
            assembling each locally optimized route segment into the optimized route;
         generate, using the network optimizer, an optimized operation wherein the generation of the optimized operation is based on real-time network conditions associated with the one or more routes and the each route segment, using a selection for the each route segment based on the assignment of the operator and an association between a minimum temporal datum and an executed operation of the multimodal unit;
         display, using a graphical user interface of a downstream device, a visualization of the optimized operation; and
         execute, using the at least a processor, the optimized operation.

2. The apparatus of claim 1, wherein determining, using the network optimizer, the optimized route further comprises:
   monitoring a delay datum of the operator associated with the multimodal unit; and
   reassigning the operator for the multimodal unit based on the delay datum.

3. The apparatus of claim 1, further comprising assigning, using the network optimizer, the operator by applying, using the at least a processor, a ranked system comprising entity preferences associated with the operator.

4. The apparatus of claim 1, wherein the network optimizer is trained using training data comprising historical optimized operations and associated with system feedback.

5. The apparatus of claim 1, further comprising:
   generating, using the network optimizer, one or more subsequent optimized operations based on user feedback received using the graphical user interface of the downstream device.

6. The apparatus of claim 1, wherein generating the visualization of the optimized operation comprises rendering a dashboard, wherein the dashboard displays a unique identifier of the multimodal unit, a present geolocation of the multimodal unit, the plurality of route segments associated with the multimodal unit, and real-time data associated with the multimodal unit.

7. The apparatus of claim 1, wherein the entity data comprises:
   identification information associated with the multimodal unit; and
   capacity constraints of the multimodal unit.

8. The apparatus of claim 1, wherein displaying the optimized operation using the graphical user interface comprises:
   generating a visual map indicating the optimized route of the multimodal unit;
   displaying a timeline interface showing projected arrival time; and
   presenting the assignment of the operator.

9. The apparatus of claim 1, wherein generating the one or more routes of the multimodal unit further comprises:
   identifying, using geospatial mapping data, segment parameters, wherein the segment parameters further comprise regulatory data; and
   computing, using historical port data, projected duration times for each route.

10. A method for generating an optimized operation of a multimodal unit as a function of a network optimizer, wherein the method comprises:
   receiving, using at least a processor, entity data from an entity database;
   retrieving, using an application programming interface, port data from a port node;
   identifying, using the at least a processor, a geolocation of a multimodal unit;
   generating, using the at least a processor, one or more routes of the multimodal unit as a function of a target temporal datum and real-time data;
   determining, using a network optimizer, an optimized route of the one or more routes based on the target temporal datum, the real-time data, and an assignment of an operator, wherein determining the optimized route comprises:
      receiving a plurality of route segments of the one or more routes;
      locally optimizing each route segment of the plurality of route segments for a segment parameter; and
      assembling each locally optimized route segment into the optimized route;
   generating, using the network optimizer, an optimized operation wherein the generation of the optimized operation is based on real-time network conditions associated with the one or more routes and the each route segment, using a selection for the each route segment based on the assignment of the operator and an association between a minimum temporal datum and an executed operation of the multimodal unit;

displaying, using a graphical user interface of a downstream device, a visualization of the optimized operation; and executing, using the at least a processor, the optimized operation.

11. The method of claim 10, wherein the network optimizer further comprises:

monitoring a delay datum of the operator associated with the multimodal unit; and reassigning the operator for the multimodal unit based on the delay datum.

12. The method of claim 10, further comprising assigning, using the network optimizer, the operator by applying, using the at least a processor, a ranked system comprising entity preferences associated with the operator.

13. The method of claim 10, wherein the network optimizer is trained using training data comprising historical optimized operations and associated with system feedback.

14. The method of claim 10, further comprising:

generating, using the network optimizer, one or more subsequent optimized operations based on user feedback received using the graphical user interface of the downstream device.

15. The method of claim 10, wherein generating the visualization of the optimized operation comprises rendering a dashboard, wherein the dashboard displays a unique identifier of the multimodal unit, a present geolocation of the multimodal unit, the plurality of route segments associated with the multimodal unit, and real-time data associated with the multimodal unit.

16. The method of claim 10, wherein the entity data comprises:

identification information associated with the multimodal unit; and capacity constraints of the multimodal unit.

17. The method of claim 10, wherein displaying the optimized operation using the graphical user interface comprises:

generating a visual map indicating the optimized route of the multimodal unit;

displaying a timeline interface showing projected arrival time; and presenting the assignment of the operator.

18. The method of claim 10, wherein generating the one or more routes of the multimodal unit further comprises:

identifying, using geospatial mapping data, segment parameters, wherein the segment parameters further comprise regulatory data; and computing, using historical port data, projected duration times for each route.

* * * * *